Figure 1:
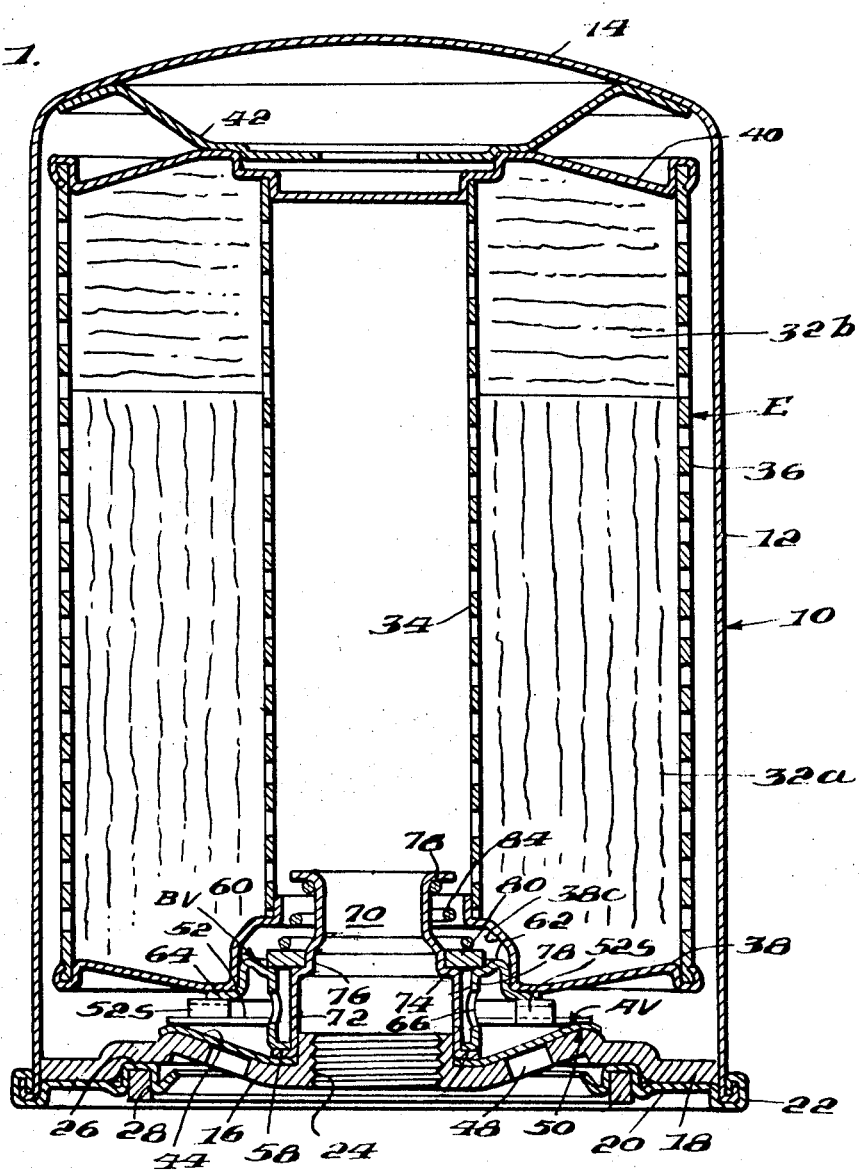

United States Patent

[11] 3,608,724

[72] Inventor Jesse A. Baldwin
           Kearney, Nebr.
[21] Appl. No. 1,238
[22] Filed Jan. 7, 1970
[45] Patented Sept. 28, 1971
[73] Assignee J. A. Baldwin Manufacturing Company
           Kearney, Nebr.

[54] OIL FILTERS WITH FRONT-END BYPASS VALVE
     7 Claims, 4 Drawing Figs.
[52] U.S. Cl. .................................... 210/130,
                             210/136, 210/440, 210/443
[51] Int. Cl. ..................................... B01d 35/14,
                                                  B01d 27/10
[50] Field of Search ........................... 210/130,
                                                136, 440, 443

[56] References Cited
           FOREIGN PATENTS
950,810  2/1964  Great Britain ............. 210/130

Primary Examiner—Frank A. Spear, Jr.
Attorney—J. Harold Kilcoyne

ABSTRACT: An oil filter incorporating a front-end bypass valve interposed between the baseplate providing the front or bottom closure of the filter shell and a filter element contained therein. Said bypass valve is so constructed as to provided a relatively elongated and unobstructed annular oil flow channel therethrough which at its lower end is in full open communication with the interior space of the filter adjacent its lower, oil-entering end and whose upper end connects to the oil outlet opening of the filter via a ring valve which is urged to its seated, channel-closing position by a spring reactive against its upper face. The arrangement is such that when oil pressure within the interior space of the filter, and which is always effective on the under face of the ring valve, exceeds the seating force exerted by said spring on the upper face thereof, due to normal oil flow through the filter element being restricted because of clogging or the oil being too viscous as to readily flow therethrough, the bypass valve provides an alternate path of oil flow between the filter oil inlet and filter oil outlet openings, which path is characterized by a minimum obstruction and is further sufficiently elongated as to reduce restriction of oil flow due to turbulence caused by change of oil flow direction.

INVENTOR
JESSE H. BALDWIN,
BY
ATTORNEY

PATENTED SEP28 1971 3,608,724

SHEET 2 OF 2

INVENTOR
JESSE A. BALDWIN,

BY [signature]

ATTORNEY

OIL FILTERS WITH FRONT-END BYPASS VALVE

This invention relates to improvements in oil filters of the general type employed to filter out contaminants from the lubricating oil being supplied to the bearings or other parts of an automotive engine requiring lubrication under the pressure developed by the engine oil pump, and more particularly to a full-flow oil filter as aforesaid incorporating a new and improved front-end bypass valve providing for the oil bypassing the filter element or cartridge when oil flow therethrough is restricted due to the accumulated contaminants clogging same or because of cold viscous oil.

By way of background for the present invention, it is explained that recent evaluation studies of oil filters incorporating front-end bypass valves, available both to automobile manufacturers as new equipment or to the general public as replacement filters, have revealed that the so-incorporated bypass valves were consistently open to the objection of being inefficient to varying degree, in terms of the volume of oil which they were able to deliver to the engine bearings and other engine parts requiring lubrication from a given pressure available from the engine oil pump, this despite the fact that some automobile manufacturers' warranties are based on the use of an oil filter employing a front-end bypass valve, as distinguished from the more conventional rear or distal end bypass valve.

Stated broadly, it is a major object of the present invention to provide a full-flow oil filter featured by a high-efficiency front-end bypass valve of unique design and which is so constructed and arranged as to impose a minimum of restriction of oil flow therethrough when bypass is called for, whereby to deliver a maximum quantity of lubricating oil to the engine bearings or other parts of the engine needing lubrication from the pressure capable of being developed in the engine oil pump.

A more detailed object of the invention is to provide a bypass valve unit for incorporation in a full-flow oil filter of the so-called disposable type and which is characterized by uniquely streamlined oil flow channels therethrough which impose minimum restriction to oil flow for a given size.

Yet another object of the invention is the provision of a full-flow filter bypass valve of simple, practical and compact construction and which is such as to enable said valve to be economically manufactured and readily assembled in an oil filter of proven design such as that disclosed and claimed in my copending application Ser. No. 763,173, filed Sept. 27, 1968, now U.S. Pat. No. 3,557,958.

Yet another object of the invention is the provision of an oil filter bypass valve of the so-called front-end type whose construction is such that as enables it to be effectively combined with the bottom plate and antidrainback valve features as disclosed and claimed in my aforesaid prior application Ser. No. 763,173.

Figure 2:
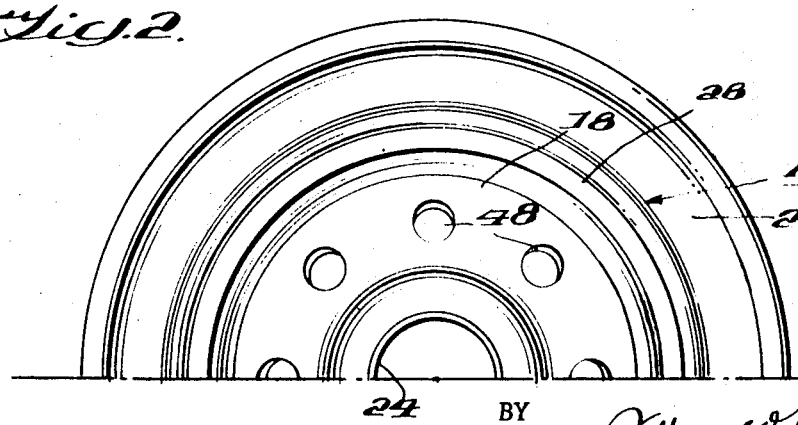
Figure 3:
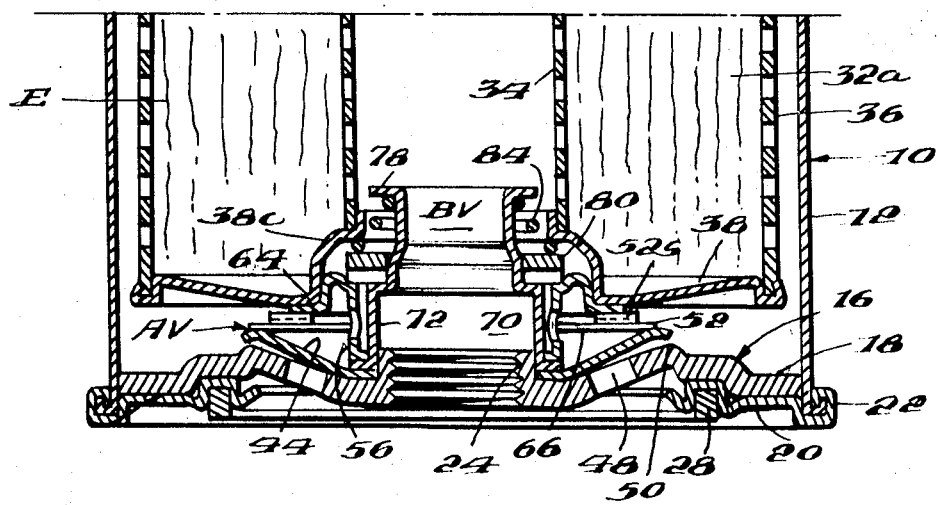
Figure 4:
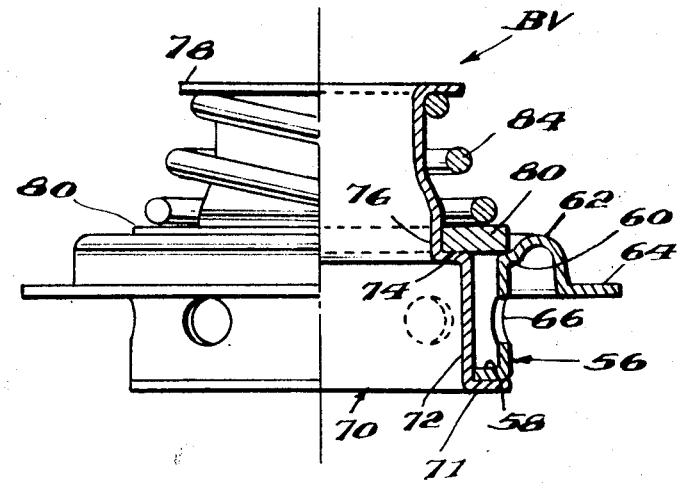

The above and other objects and features of advantage of an oil filter incorporating an improved front-end bypass valve according to the present invention will be set forth or understood from the description of said invention, taken with the accompanying drawings, wherein FIG. 1 is a vertical section taken through an oil filter incorporating a front-end bypass valve as herein proposed;

FIG. 2 is a fragmentary bottom plan view of the filter shown in FIG. 1;

FIG. 3 is a partial vertical section of the lower portion of the filter and front-end bypass valve shown in FIG. 1, and which further illustrates both the antidrainback valve and said front-end bypass valve in their respective open positions; and FIG. 4 is a side elevation, in quarter section, illustrating the unit construction of a bypass valve according to the invention on an enlarged scale as compared to that on which said valve is shown in the preceding drawing figures.

Referring to the drawings in detail, it is first to be noted that, in the interest of simple disclosure but without limiting effect since it may be usefully incorporated in oil filters of other designs, the improved front-end bypass valve as herein proposed has been shown to be and will be described as incorporated in an oil filter as is disclosed and claimed in my aforementioned pending patent application Ser. No. 763,173, in which association it combines in highly effective manner with the bottom plate and antidrainback valve features thereof, and in fact serves, in addition to providing relatively unrestricted oil bypass around the filter element when such is called for, in place of the element-supporting adapter bushing thereof. Thus, such a filter, which is generally designated 10, is of the so-called disposable type, i.e. one whose filter element E is permanently secured within the filter shell or can, and it is further of the type known in the art as a spin-on- or screw-on-type filter adapted to be mounted directly to the engine block simply by screwing same on to an appropriately threaded nipple provided on and projecting from said block and being demountable by a simple screwing-off operation when filter replacement is indicated to be necessary.

More particularly, said filter 10 comprises a thin-wall cylindrical shell or can 12 closed at one end, i.e. its upper or distal end, by a dome-shaped end wall 14 and closed at its initially open end by a baseplate assembly generally designated 16 comprising a thick-wall, i.e. heavy-gauge, annulus 18 having a planar outer peripheral portion of diameter substantially that of the inner diameter of said can and which is secured to the lower open end edge portion of said can by a separately formed sheet metal annular closure plate 20 which conventionally is spotwelded to the under face of said annulus and which is lock seamed as at 22 to said lower-end edge portion of said can.

The heavy-gauge annulus component of said baseplate assembly is formed along its inner margin with an axially inwardly (of the can interior), internally screw-threaded neck 24 by which the filter 10 as a whole may be mounted in operating position directly on the engine block (not shown) by screwing same on to the threaded nipple provided thereon. In addition to its function of securing the baseplate assembly 16 in filter shell or can closing relation as shown, said annular thin-metal cover plate component 20 thereof also serves to mount in a downwardly facing groove 26 provided therein during the course of its fabrication an annular sealing gasket 28 which is adapted to sealingly engage an appropriate flat and usually raised mounting surface provided on the engine block when said filter is screwed to its operating position on the aforesaid nipple, all in well-known manner.

The aforesaid filter element E is permanently mounted within the closed can or shell 12 of the filter between the closed end 14 thereof and its baseplate assembly 16 and is illustratively shown to be of the dual-media type. That is to say, its main (lower) filtering section 32a is of cotton and its secondary (upper) filtering section designated 32b is of a fiber selected for its ability to permit oil flow therethrough under atmospheric conditions causing the oil to be too viscous to readily pass through the media of the main filter section 32a, for example, when engine starting at lower temperatures is required. Both said filter element section 32a, 32b are enclosed as usual within the annular space defined by inner and outer concentrically arranged perforated sheet metal tubes 34, 36, respectively, which function as screens, which space is closed at its end by imperforate end caps 38, 40 suitably secured to the ends of said inner and outer tubular screens.

According to the invention and as is best seen in FIG. 1, the filter element or cartridge E is bodily urged downwardly towards the baseplate assembly 16 by a plate or disc spring 42 interposed between and reactive against the closed upper end 14 of the filter cup or shell and the upper end cap 40 of said element, but is supported in raised position above said baseplate assembly by a front-end bypass valve unit BV (shown as such in FIG. 4 and which will be later described in detail).

In the filter in which it is shown to be incorporated in the several views, said bypass valve unit BV also functions to secure an annulus 44 of flexible rubber or rubberlike material such as neoprene constituting the valve element of an antidrainback valve generally designated AV, along its inner edge and thus in operative position against the upper (inner) face of the baseplate assembly 16.

It will be seen from the foregoing that in providing a support for the filter element E and a means for securing the flexible valve element 44 of the antidrainback valve in operative position against the inner face of the base or closure plate of the illustrated filter, the front-end bypass valve of the present invention functions much as the so-called adapter bushing which is interposed between the filter element and baseplate assembly of the filter, as shown and described in my aforesaid copending application Ser. No. 763,173.

Before proceeding to describe in detail the front-end bypass valve BV with which the present invention is primarily concerned, the normal oil flow path through the filter will first be described. More particularly, the baseplate assembly 16 is provided with a plurality of circumferentially spaced oil entry openings 48 disposed on a circle of radius intermediate that of the radii of the circle of the inturned baseplate neck 24 and of the inner edge of the annular closure plate 20 of said baseplate assembly. Accordingly, assuming the filter to be properly mounted on an engine block and the engine placed in operation, which also results in the engine oil pump being placed in operation, oil under pressure enters the interior space of the filter and thence passes inwardly through one or both of the filter sections 32a, 32b, and thence downwardly through the inner screen 34 and back to engine through the inturned baseplate neck 24.

The aforesaid antidrainback valve AV serves to prevent the oil then in passage between the oil entry openings 48 and the inturned baseplate neck 24 constituting the oil outlet passage of the filter from draining back into the engine when operation of the latter is stopped. This statement of function of said valve AV correctly presupposes that it operates to close off said oil entry openings 48 in the absence of oil pressure effective on the under surface of its valving element 44 and to uncover said oil entry openings when the engine and hence the engine-driven oil pump are in operation, as results in oil under pressure being directed against the under surface of said valve element 44.

To perform such functions, the structure and operation of the antidrainback valve, and particularly of the flexible-material annulus 44 which provides the movable valving element thereof, follow that described and claimed in my aforesaid application Ser. No. 763,173, and hence need only be briefly described. Suffice it to say that said flexible material annulus 44 is pressed tight against the upper face of the baseplate annulus 18 along the respective inner peripheral edges of each and hence radially inwardly of the aforesaid circular series of oil entry openings 48, by downward pressure exerted thereon by the front-end bypass valve BV of the invention, but its middle-zone portion which directly overlies said oil entry openings 48 in the baseplate and covers said openings when operation of the engine is stopped together with the outer peripheral edge portion thereof, are free to flex upwardly from the upper face of the baseplate annulus 18 in response to oil from the engine at the pressure developed by the engine pump being directed against the under face of said valve annulus through said oil entry openings 48.

Normally, said outer peripheral edge portion of said flexible valve annulus 44 is maintained seated with light spring pressure against a circular line-form seat designated 50 provided on the upper face of the baseplate annulus 18, as by sloping the inner radial-zone portion of said baseplate which extends about its inturned neck 24 downwardly from its relatively outer radial edge portion, which latter preferably is sloped in generally upward direction. Preferably, said light spring pressure is provided by spring means interposed between said baseplate annulus and the filter element E so as to be reactive therebetween, and which illustratively comprises a flat annulus 52 of springy sheet metal centered on said baseplate neck 24, whose outer edge diameter is somewhat greater than that of the circular line-form seat 50 and of the flexible material annulus 44 whereby it is adapted to seat thereagainst. Said spring metal annulus 52 further incorporates a plurality of upwardly inclined and circumferentially extending spring fingers or leaves 52s struck out from the material thereof, which extend along a circle of radius such that their free ends bear against the lower end cap 38 of the filter element E outwardly of the junction of its inner screen (center tube) 34 and said bottom end cap 38 of said filter element. It will be understood that by design the upward projection of said spring fingers 52s from the spring metal annulus 52 from which they are struck out as aforesaid is such that they will be stressed in the final assembly of filter element in filter shell or can be an amount as provides a desired light holding pressure effective on the outer rim portion of said flexible material valve annulus 44.

Now describing the front-end bypass valve BV in detail, it will be understood from the FIG. 4 showing thereof that such preferably takes the form of a compact subassembly unit which can be economically fabricated and which is further capable of being readily assembled to the baseplate 16 (after proper placement of the antidrainback valve AV on the latter) merely by centering same on the inturned baseplate neck 24, all prior to the lock seaming of filter can 12 with filter element positioned therein, to said baseplate 16. More particularly, said valve BV comprises the four parts as follows: a relatively short-length cylindrical valve body 56, a tubular spring retainer 70 having substantially greater axial length than and which is adapted to be assembled in coaxial relationship within said valve body 56, a rigid ring-form valve element 80, and coil spring 84.

As best seen in FIG. 4, said cylindrical valve body 56 terminates at its lower end in a radially inturned foot flange 58 and its upper end is turned radially outwardly, thus to provide thereat an upwardly facing step or shoulder 60 which extends throughout the full 360° circumference of said valve body. Illustratively, said step is bounded along its outer periphery by a full-circular raised bead or rim 62, from which the valve body is extended downwardly on a small radius and finally terminates in a radially outwardly projecting full-circular ledge 64 which provides a bottom support for the filter element E, the lower end cap 38 of which is preferably counterbored as at 38c, thus providing a downwardly opening recess which, with the bore of the inner screen 34 of the filter element E, insures accommodation of the bypass valve BV in the limited space available for its mounting, all as shown in FIGS. 1 and 3.

As so far described, it will be appreciated that the valve body 56 functions as a tubular supporting column for the filter element E substantially as the adapter bushing of my aforesaid application Ser. No. 763,173. To enable it to function as a valve body as well, which is its primary function according to the present invention, it is provided in its lower-end cylindrical wall portion with a plurality of relatively large and permanently uncovered oil entry openings 66.

Said tubular spring retainer part 70 is characterized by a lower cylindrical section 72 which is sized to fit closely about and center on the inturned neck 24 of the baseplate 16. Further, the diameter of said lower section is substantially less than that of the cylindrical valve body 56, and it terminates at its lower end in an outwardly turned foot flange 71, on which the corresponding but inturned foot flange 58 of said valve body rests. Said lower section 72 terminates at its upper end in an inturned, upwardly facing, full-circular step or shoulder 74 which is concentric with and disposed at the same level as the corresponding but out-turned step 60 provides on the valve body 56 as aforesaid. From said step 74, the retainer extends upwardly for a substantial distance, first as a short-length cylindrical guide portion 76 (for guiding the ring valve 80 to be described in its opening and closing movements) and from thence as an upright extension section having substantially reduced diameter and which terminates at its upper end in an out-turned spring-seating flange 78.

From the foregoing it will be seen that the valve body 56 and the lower section 72 of the tubular spring retainer are adapted to be so related one to the other as to provide a closed-bottom annular oil flow channel devoid of restriction and of substantial axial length therebetween, through which oil entering through the permanently uncovered openings 66 provided in the valve body wall and leaving through the full annular slotlike opening defined by said concentric coplanar steps 60 and 74 will flow with a minimum of turbulence, such of course assuming that said slotlike opening is uncovered. However, according to the invention said ring valve 80 normally closes off said annular oil outflow although uncovering same when a particular operating condition calling for same develops.

More particularly, the radial width of the ring valve 80 is greater than the width of said annular slotlike oil outflow opening by an amount such that its outer and inner edge portions are adapted to seat on said coplanar and concentric steps 60 and 70, respectively. The aforementioned coil spring 84 which is disposed in encircling relation on the upper extension portion of said tubular retainer 70 is reactive between the spring seating flange 78 thereof and the upper radial face of said ring valve and thus operates to maintain said ring valve seated until the pressure of the oil effective against its under face exceeds the downward force which said coil spring exerts on its upper face. When such occurs, the ring valve will be raised from its seat as aforesaid whereupon the oil entering the flow channel as aforesaid may flow relatively freely therefrom.

In such raising or uncovering and subsequent reseating movements, the ring valve will be guided by the raised bead 62 which bounds the step 60 of the valve body, acting jointly with the short-length cylindrical guide portion 76 of the spring retainer 70.

As previously forecast, the aforesaid valve BV is designed to be assembled in an oil filter in interposed relation between the baseplate 16 and the filter element E thereof, as shown in FIGS. 1 and 3. In such position, the upright small-diameter extension section of the spring retainer 70 of said valve will extend a substantial distance into the bore of the inner screen 34 of the filter element. Since the diameter of said extension section is substantially less than that of the bore of said inner screen, it will be seen that there is formed therebetween an annular oil flow channel which extent in continuation of the aforesaid annular flow channel between the valve body 56 and lower section 72 of the spring retainer parts of the bypass valve. Thus any oil entering the lower end of said flow channel through the oil entry openings 66 provided in the valve body 56 and leaving said channel when its pressure exceeds that of the force which the spring 84 exerts on the ring valve 80 will flow more or less freely through said annular extension passage into at least the lower bore of the inner screen 34, then outwardly through the bore of said spring retainer 70 and from thence back to the engine oil system. Thus it will be seen that in addition to its numerous functions as explained above, the tubular spring retainer 70 also serves as an inward extension of the inturned neck 24 of the baseplate.

Having already described the normal oil flow path through the filter, the alternate oil flow path around the filter as provided by the bypass valve BV of the invention will now be briefly described. Since the oil-entry openings 66 provided in the valve body 56 are permanently uncovered, any oil entering the filter shell enclosure will also freely enter and fill the annular flow channel of the bypass valve as provided between the valve body and the lower section 72 of the tubular spring retainer parts thereof. Assuming no undue restriction of oil flowing through the filter element E, the ring valve 80 closes off said oil flow channel of the bypass valve so that during this condition of operation no oil flow through and out from the bypass valve can take place. However, should restricted oil flow through the filter element E develop due to accumulation of contaminants therein or because of cold viscous oil which, if permitted to continue in a full-flow-type filter, can result in the bearings and other parts of the engine requiring lubrication being starved of oil and, in the extreme case, in the filter shell or can bursting under the increased oil pressure, the ring valve 80 will open upon a predetermined slight increase of such pressure against the force exerted thereon by the spring 84, thereby to establish an oil flow path around the ineffective or clogged filter element, whereupon the oil entering the filter, rather than building up pressure therein, can flow back to the engine oil passage or passages.

But over and above its ability to provide such an alternate oil path under a condition or conditions calling for same, the design of a front-end bypass valve as herein proposed is notable for its ability to provide a bypass flow path which is substantially clear of obstruction or restriction and thus is highly efficient in terms of the volume of oil which it can deliver to the engine bearing and parts requiring lubrication from a given pressure from the engine-driven oil pump. Furthermore, by virtue of the placement of the oil entry openings to the valve assembly at a relatively low level thereof and of the oil flow path extending vertically well into the inner screen of the filter element, as results in a maximum length of flow path allowing the fluid flow to stabilize as much as possible following a change of direction, any restriction to oil flow moving through the bypass valve due to turbulence is substantially reduced.

As many changes could be made in carrying out the above constructions without departing from the scope of the invention, it is intended that all matter contained in the above description or shown in the accompanying drawing shall be interpreted as illustrative and not in a limiting sense.

I claim:

1. An oil filter comprising a filter shell closed at its front end by a closure plate having a plurality of circumferentially spaced, oil-entry openings and an inturned neck whose bore provides a central oil outlet opening, an annular filter element enclosed within said closed filter shell and means mounting same in the normal path of oil flow between said oil entry and oil outlet openings for filtering the oil flowing therebetween, and bypass valve means also enclosed within said closed filter shell and operative to provide an alternate path of oil flow between said oil entry and oil outlet openings responsive to increased oil pressure developing within the closed filter shell with restriction of oil flow through said filter element, said bypass valve means comprising a cylindrical valve-body member interposed between said front-end closure plate and said filter element, a tubular member of lesser diameter than and being mounted coaxially within said valve-body member and forming therewith a relatively elongated closed-bottom open-top passage, said valve-body member being provided in its lower periphery with nonvalved oil entry openings which establish full open communication between the interior space of the closed filter shell adjacent its front end and said annular passage, annular upwardly facing valve seat means at the open-top end of said passage, a ring valve operatively associated with said valve seat means and being movable between a seated position in which it closes off the open-top end of said annular passage and a raised position in which it places said annular passage in full-open communication with said central oil outlet opening, and spring means mounted exteriorly of said passage for maintaining said ring valve seated but allowing said valve to move to its raised position upon predetermined increase of oil pressure developing within the closed filter shell as aforesaid.

2. An oil filter according to claim 1, wherein said cylindrical valve-body member provides said filter-element-mounting means.

3. An oil filter according to claim 1, wherein said valve-seat means comprises coplanar and concentric outwardly and inwardly turned steps on the valve-body and inner tubular members, respectively, on which the outer and inner marginal edges of the ring valve seatably engage under the bias of said spring means effective on said valve as aforesaid.

4. An oil filter according to claim 1, wherein said valve-body and inner tubular members are together centered on said inturned neck of the closure plate and extend coaxially with respect to the filter element, and wherein said cylindrical valve-body member directly supports said filter element from the closure plate.

5. An oil filter according to claim 4, and further including antidrainback valve means for closing said oil entry openings in the closure plate to reverse oil flow therethrough including a flexible-material annular valve member also centered on said inturned neck of the closure plate and being held thereto along its inner edge portion by said similarly centered valve-body and inner tubular members of the bypass valve, between which and the closure plate said inner edge is interposed.

6. An oil filter according to claim 4, wherein said inner tubular member has substantially greater axial length than said valve-body member and its upper end portion extends into the central opening of the annular filter element and terminates in a spring retaining flange, between which and said ring valve said spring means is reactive.

7. An oil filter according to claim 6, wherein said tubular member provides an inward extension of said filter outlet opening and its upper end portion has lesser diameter than that of said central opening of the filter element into which it extends, thereby forming with the central-opening wall an annular passage which extends in continuation of said ring-valve-controlled annular passage and connects the latter passage with the filter outlet opening.